Patented Sept. 14, 1954

2,689,226

UNITED STATES PATENT OFFICE 2,689,226

MANUFACTURE AND USE OF CATALYSTS

James Hoekstra, Evergreen Park, Ill., assignor to Universal Oil Products Company, Chicago, Ill., a corporation of Delaware No Drawing. Application March 8, 1950,
Serial No. 148,510

9 Claims. (Cl. 252—442)

This is a continuation-in-part of my co-pending application Serial No. 131,509 filed December 6, 1949, now abandoned.

This invention relates to the manufacture and use of catalysts and more particularly to the manufacture and use of catalysts containing platinum.

The manufacture and use of platinum containing catalysts have heretofore been suggested, but it is only recently that a process for the reforming of a gasoline in the presence of a platinum containing catalyst has become commercial. The recently developed commercial process utilizes low amounts of platinum in association with alumina. Because the platinum is utilized in low amounts, it is necessary that impurities in the catalyst be reduced to a minimum. In view of the fact that the alumina comprises a major proportion of the catalyst, it is important that the alumina utilized in the preparation of the catalyst be substantially free from impurities.

The use of the catalyst in substantially spherical or spheroidal shape offers numerous advantages. When used as a fixed bed of packing material in the reaction zone, the spheroidal catalyst permits more uniform packing and, therefore, reduces variations in pressure drop through the bed and accordingly reduces channeling which otherwise results in a portion of the bed being by-passed. Another advantage to the use of particles of this shape is that the spheres contain no sharp edges to break or wear off during processing or handling and, therefore, reduces the tendency to plug the process equipment. It is thus seen that the use of substantially spherical of spheroidal catalyst particles permits a more effective utilization of the catalyst.

The present invention is directed to a novel method of manufacturing substantially spherical or spheroidal catalyst particles containing platinum and alumina. As will be hereinafter set forth in detail, the novel method of the present process offers a very economical method of manufacturing these catalysts as compared to the prior methods involving high pressure pilling operations.

In one embodiment the present invention relates to a method of manufacturing a catalyst which comprises commingling an alumina sol with a weak base having a strong buffering action at a pH of from about 4 to about 10 and an increased rate of hydrolysis at an increased temperature without the evolution of gas, passing the resultant mixture in finely divided form into a water immiscible suspending medium maintained at an elevated temperature, retaining the alumina sol in said suspending medium until gelation occurs, aging the resultant gel particles in a basic medium, compositing platinum with said alumina particles, and subsequently heating the composite.

In a specific embodiment the present invention relates to a method of manufacturing a spheroidal shaped catalyst which comprises forming an alumina sol, commingling said sol with water and hydrogen fluoride to form a mixture containing from about 15% to about 35% by weight of alumina and from about 0.1% to about 3% by weight of fluorine in the final catalyst, separately commingling water with hexamethylene tetramine to form a solution containing from about 15% to about 40% by weight of hexamethylene tetramine, commingling said mixture and said hexamethylene tetramine solution in volume ratios of hexamethylene tetramine solution to said mixture of from about 3:1 to about 1:1.5, passing droplets of the resultant mixture into an oil bath maintained at a temperature of from about 120° to about 220° F., retaining the droplets in said oil bath until the droplets set to hydrogel spheres, aging said spheres in the presence of hexamethylene tetramine, washing and drying said spheres and thereafter combining platinum therewith in an amount of from about 0.01% to about 1% by weight of said alumina on a dry basis.

In another embodiment the present invention relates to the reforming of a gasoline fraction which comprises subjecting said gasoline fraction to contact at reforming conditions with a catalyst prepared in the manner herein set forth.

The preparation of satisfactory alumina spheres for compositing with the platinum and, when desired, a halogen and particularly hydrogen fluoride, requires several critical features. In contrast to the preparation of some other inorganic oxide particles as, for example, silica spheres, the preparation of satisfactory alumina spheres requires the use of an alumina sol, the use of a particular type of buffering agent and the use of a particular type of aging of the spheres prior to contacting with water. Thus, the conventional method of preparing shaped inorganic oxide particles by adding a conventional precipitating agent, such as ammonium hydroxide, to an aluminum salt, such as aluminum chloride, aluminum nitrate, etc., cannot be employed because a gelatinous precipitate sets immediately. Further, when formed, the alumina spheres cannot be contacted with water as in the conventional method of preparing silica spheres utilizing a lower elevel of water beneath the layer of oil because the alumina spheres will become dissolved in the water. As still another feature of the present invention, the alumina spheres after proper aging may be readily washed to remove volatile impurities and thereby prepare an alumina which is particularly suitable for use in the preparation of catalysts containing low concentrations of platinum.

As hereinbefore set forth, alumina spheres are prepared by commingling an alumina sol with a particular buffering agent. In one of the preferred methods of preparing the alumina sol, aluminum metal is added to an aqueous solution of aluminum chloride and this mixture is subjected to heating and digesting at its boiling point. In general, this temperature will range from about 175° to about 210° F. The time of heating and digesting will depend upon the purity and particle size of the aluminum metal employed. With a substantially pure metal, the time may range from about 24 to about 72 hours or more and this time of heating and digesting will be reduced as impurities in the metal are increased. However, the aluminum metal used should be substantially pure in order not to introduce impurities into the catalyst from this source. Likewise, the aluminum chloride utilized should be substantially pure. In some cases the time of heating and digesting can be expedited by adding an extraneous metal which is lower than aluminum in the electromotive series of elements but the extraneous metal must be one that will not introduce an undesired impurity into the final catalyst. Another method of expediting the heating and digesting is to pass oxygen into the mixture, as this serves to oxidize the hydrogen and thereby expedite the reaction.

The product resulting from the heating and digesting of the aluminum chloride and aluminum metal is referred to in the present specification and claims as an alumina sol. The exact chemical composition of this product has not been definitely established but it may be represented approximately by the formula 4½ Al(OH)$_3$.AlCl$_3$. However, it is understood that the present invention is not limited to this specific composition, and that this product also may be referred to as a solution, colloidal solution, etc. In any event, this product contains less combined chlorine than is present in aluminum chloride (AlCl$_3$) and also is readily soluble in water. It has been found that, in the preparation of the alumina sol, the mol ratio of aluminum chloride to aluminum metal is preferably within the range of from about 1:3 to about 1:5. Ratios of aluminum chloride to aluminum metal substantially outside of this range result in a sol which sets immediately into a precipitate upon the addition of the weak base or in the formation of gel spheres which are too soft and, therefore, unsatisfactory. Aluminum nitrate may be utilized in place of aluminum chloride but not necessarily with equivalent results.

When the available aluminum metal contains an undesirable impurity which will be introduced into the final catalyst, another method of preparing the alumina sol comprises subjecting a solution of an aluminum salt and particularly aluminum chloride to electrolysis in an electrolytic cell having a porous partition between the anode and the cathode. An acid anion deficient aluminum salt solution may then be recovered from the cathode compartment. In still another method, a solution of an aluminum salt may be subjected to treatment with an anion exchange agent which will remove some of the acid from a salt solution. It is understood, however, that these methods are not necessarily equivalent to that obtained by reacting the aluminum salt with aluminum metal.

The alumina sol as prepared in the above manner is a colorless to slightly yellow liquid and, as hereinbefore set forth, is readily miscible with water. The sol is prepared to contain from about 15% to about 35% by weight of alumina calculated as Al$_2$O$_3$ or adjusted to the proper concentration by dilution with water or by evaporation of water from the sol. It has been found that sols having a concentration of alumina above about 35% set to a gel immediately upon commingling with the basic reagent or may result in spheres which are brittle and crack easily. On the other hand, sols having a concentration below about 15% result in spheres which are too soft and, therefore, unsatisfactory. However, as will be hereinafter set forth, the amount of water in the sol may be varied depending upon the amount of water in the weak base which is commingled with the sol.

As hereinbefore set forth, an essential feature of the present invention is in the selection of the weak base for commingling with the alumina sol in order to prepare a mixture which will set to a gel within a reasonable time and which will form alumina spheres of desired rigidity. The weak base for use in accordance with the present invention must be water soluble and have a strong buffering action at a pH of from about 4 to about 10 and preferably from about 5 to about 8.5 and this means that the base, at a pH within this range, may be commingled with a relatively large amount of acidic material and still not substantially decrease the pH of the mixture. Therefore, for example, the conventional ammonium hydroxide cannot be used because it does not meet this requirement and, as hereinbefore set forth, a gelatinous mass is immediately precipitated.

It will be noted that the weak base for use in accordance with the present invention is defined as having a strong buffering action at a pH of from about 4 to about 10. When measured at room temperature, this strong buffering action is more pronounced at a pH of from about 4 to about 6. However, it is believed that at a higher temperature and particularly at the temperature utilized in the forming zone of the present process, this buffering effect may be more pronounced at a higher pH range which may be from about 5 to about 10. For example, it has been found that, when different samples of a weak base comprising hexamethylene tetramine were heated in admixture with different concentrations of hydrochloric acid and then cooled, the pH of the sample varied from the pH of similar samples which had not been so heated. It is appreciated that pH determinations are now made at room temperature because of the ease in so doing and the difficulties encountered when attempting to measure the pH at elevated temperatures. Therefore, it is understood that the pH range used in the present specification and claims is intended to include determinations made at room temperature as now generally practiced or at an elevated temperature by a modified analytical method.

The weak base also must have an increased rate of hydrolysis at an increased temperature without the evolution of gas. This permits commingling the weak base with the alumina sol at normal temperatures, which generally will be below about 110° F., without precipitation of a gelatinous mass. Upon heating the mixture to an elevated temperature of from about 120° to about 220° F., the alumina sets to a gel and this permits forming spheroidal alumina in the manner to be hereinafter set forth in detail. For example, it has been found that, upon commingling the alumina sol with a weak base comprising hexamethylene tetramine, gelation occurred in about 3–5 hours at room temperature of about 70° F. However, when heated to a temperature of 190° F., gelation occurred in 1 to 2 seconds. Still further, when refrigerated to a temperature of from about 32–35° F. gelation did not occur in 5 days. Therefore, it is important that the weak base has the property of an increased rate of hydrolysis at an elevated temperature so that the alumina sol and base may be commingled at a normal temperature without gelation but that gelation will occur within a reasonable time when passed into a heated suspending medium in the manner to be hereinafter set forth.

Still further, another requirement of the weak base is that it will not result in the evolution of gas at the elevated temperature employed in the process. For this reason, ammonium carbonate cannot be employed because it will result in the evolution of carbon dioxide which will disrupt the formation of the alumina spheres.

It has been found that a particularly suitable weak base for use in accordance with the present invention is hexamethylene tetramine which is variously referred to as methenamine, formin, etc., and is represented by the formula $(CH_2)_6N_4$. Hexamethylene tetramine is readily prepared by the reaction of formaldehyde with ammonia. It has been found that approximately a 30% solution is particularly satisfactory for ease of handling and, when the water in the alumina sol is within the ranges hereinbefore set forth, results in a final mixture of desired water content. However, the hexamethylene tetramine solution may vary from about a 15% solution to about a 40% solution, the latter being substantially the saturation point. However, as the amount of water is increased in the hexamethylene tetramine solution, the amount of water in the alumina sol must be decreased accordingly, and vice versa.

Weak bases are also formed by the reaction of ammonia with other aldehydes such as acetaldehyde, propionaldehyde, etc. but in view of the fact that these bases have a higher pH than the reaction product of ammonia with formaldehyde and that the pH obtained with ammonia and formaldehyde appears to be optimum, there does not appear to be any advantage in using aldehydes other than formaldehyde. However, in cases where the pH of the base is too high, acid may be commingled therewith in order to reduce the pH thereof to below about 8.5. Another satisfactory weak base comprises a mixture of ammonium acetate and ammonium hydroxide, the mixture having a pH of below about 8.5. It is understood that these bases are not necessarily equivalent and also that any other suitable weak base meeting the requirements hereinbefore set forth may be used in the present invention but not necessarily with equivalent results.

The alumina sol and the solution of hexamethylene tetramine are commingled and, in a preferred embodiment of the invention, droplets are passed into an immiscible suspending medium. It has been found that equal volumes of the sol and of the hexamethylene tetramine solution are satisfactory but it is understood that this may vary somewhat. In general, however, the volume ratio of hexamethylene tetramine solution to alumina sol should be within the range of from about 3:1 to about 1:1.5 when the sol contains 26% $Al_2O_3$ and the hexamethylene tetramine solution is 30%. The use of smaller amounts of hexamethylene tetramine solution tends to result in soft spheres while, on the other hand, the use of larger volumes of hexamethylene tetramine solution results in spheres which tend to crack easily.

In the prior description, the preferred alumina sol has a chemical composition which is represented approximately by the formula

$4\frac{1}{2}$ $Al(OH)_3 \cdot AlCl_3$

This alumina sol requires the use of a solution containing from about 15% to about 35% by weight of alumina calculated as $Al_2O_3$ which in turn requires the use of a volume ratio of hexamethylene tetramine solution to alumina sol of from about 3:1 to about 1:1.5.

In another embodiment of the invention the alumina sol may be prepared to contain a higher alumina to chlorine ratio by effecting the heating and digesting of aluminum chloride in the presence of higher concentrations of aluminum metal. These concentrations are within the range of from about 1:5 to about 1:7 mol ratios of aluminum chloride to aluminum metal. In this embodiment it is important to use a more dilute solution of the alumina sol, the solution containing from about 5% to about 15% by weight of alumina calculated as $Al_2O_3$. With these low concentrations of alumina in the sol having a higher alumina to chlorine ratio, satisfactory alumina spheres may be prepared by using smaller volume ratios of hexamethylene tetramine solution which may range from about 1:2 to about 1:20 volumes of hexamethylene tetramine solution to volumes of alumina sol solution. Satisfactory spheres have been prepared when using 1 volume of hexamethylene tetramine solution to 10 volumes of alumina sol prepared and diluted as hereinbefore set forth. However, it is understood that the volume concentrations of hexamethylene tetramine which may be used satisfactorily is dependent on the mol ratio of aluminum chloride to aluminum metal used in the heating and digesting step and on the concentration of alumina in the diluted solution. Higher volumes of hexamethylene tetramine solution are required with higher ratios of aluminum chloride to aluminum metal in the heating and digesting step and with higher alumina concentrations in the aqueous solution of the sol.

In the preparation of catalysts containing combined halogen and particularly combined fluorine, the fluorine, for example, is conveniently added as an aqueous solution of hydrogen fluoride. In a preferred embodiment of the invention the aqueous solution of hydrogen fluoride is added to the alumina sol prior to commingling of the latter with the hexamethylene tetramine solution. The amount of hydrogen fluoride will be regulated to produce a final catalyst containing from about 0.1% to about 3% by weight of fluorine in the final catalyst. As hereinbefore set forth, the alumina sol should contain from about 15% to about 35% by weight of alumina and, therefore, the amount of water introduced either by means of the hydrogen fluoride solution or as additional water will be regulated to produce an alumina sol of the desired concentration of alumina.

The alumina sol and hexamethylene tetramine solution are mixed, preferably in a zone adapted to effect intimate mixing, and the mixture is then passed into the suspending medium. In a preferred method, the mixture is distributed in the form of droplets from a nozzle or orifice, the size of the nozzle determining the size of the alumina particles. When very small alumina particles are desired, the mixture may be distributed from a rotating disk.

In order to allow sufficient time for mixing and handling of the two solutions, the solutions are preferably mixed and dropped at substantially room temperature. However, it is another essential feature of the present invention that the suspending medium is maintained at an elevated temperature in order to obtain gelation within the desired time. The gelation temperature of the suspending medium may range from about 120° to about 220° F. and preferably is within the range of from about 190° to about 205° F. Temperatures below 120° F. require setting times that are too long and would necessitate a body of suspending medium which is excessive for practical purposes. On the other hand, temperatures above about 220° F. result in vaporization of the water and accordingly cracking of the spheres. The time in which the spheres remain in the suspending medium should be sufficient to form rigid spheres which will not crack or become distorted when removed from the suspending medium. It is understood that the time and temperature of suspension will be correlated to obtain the desired rigid spheres and that these factors are inversely related; that is, as the temperature is increased the time may be decreased.

Any suitable water immiscible suspending liquid which will not vaporize at these temperatures may be employed. A particularly suitable suspending liquid comprises organic liquids such as kerosene, Nujol, and similar materials which will allow the droplets to settle at a rate such that the alumina sets into a firm hydrogel during its passage through the fluid medium. While it is within the scope of the present invention to use a suspending liquid which is of higher density than the alumina spheres, in which case the alumina spheres rise upwardly through the suspending liquid, this method generally is not as preferred as is the use of a suspending medium of lower density than the alumina spheres so that the spheres descend to the bottom of the forming zone.

In a preferred embodiment of the invention, the alumina spheres are removed from the lower portion of the suspending liquid. Contrary to the experiences found with the other inorganic oxide spheres and particularly silica spheres, the alumina spheres must not be contacted with water at this stage of operation. The alumina spheres are water soluble and, therefore, would be destroyed upon being contacted with water. It, therefore, is another important feature of the present invention that the alumina spheres must be aged prior to being contacted with water. Furthermore, this aging must be in the presence of a basic medium and this, as hereinbefore set forth, comprises another essential feature of the present invention.

Another advantage to the process of the present invention is that spheres of different densities may be obtained by varying the aging. For example, when spheres of a density greater than about 0.7 are desired, these spheres being referred to herein as high density spheres, the alumina spheres are aged in a weak base of the same characteristics as the weak base originally used in preparing the spheres. This aging is effected at a temperature of from about 150° to about 212° F., preferably of from about 190° to about 210° F., for a period of at least 10 hours and preferably of from about 16 to about 24 hours or more. Thus, in a preferred embodiment the alumina spheres are aged in hexamethylene tetramine at a temperature and for a time as hereinbefore set forth.

When spheres of intermediate or high densities are desired, the spheres having densities of above about 0.5, the alumina spheres may be aged for at least 10 hours in oil at a temperature above about 125° F. and then in ammonium hydroxide for at least 10 hours. The exact density of the spheres will depend upon the concentration and temperature of the ammonium hydroxide solution, higher densities being obtained with lower concentrations and with lower temperatures. However, it is understood that the spheres must be aged first in the oil for at least 10 hours before being aged in the ammonium hydroxide solution because otherwise the spheres will become soft and will crack.

When low density spheres are desired, that is, spheres having densities of below about 0.5, the alumina spheres are aged in the suspending medium at an elevated temperature and then in ammonium hydroxide solution at an elevated temperature. The elevated temperature is above about 125° F. and generally will not be greater than about 220° F. The time of aging is at least 10 hours in each case and the ammonium hydroxide solution preferably contains from about 4 to about 5% ammonia. The density of the spheres is again determined by the concentration of the ammonium hydroxide solution and, therefore, higher density spheres are obtained when a less concentrated solution or lower volume of solution is used.

In another embodiment of the invention the spheres may be aged at an elevated temperature in the presence of the suspending medium for a period of at least 10 and preferably of from about 16 to 24 hours or more at an elevated temperature of from about 150° to about 212° F. and preferably of from about 190° to about 210° F. In effect this may be considered as aging in a basic medium because the alumina spheres will contain hexamethylene tetramine and, therefore, are being aged in the presence of this reagent.

From the above description it is apparent that the preparation of satisfactory alumina spheres requires the use of a weak base of specific requirements and also aging of the spheres in a basic medium prior to contacting them with water. These features are extremely critical in order to prepare substantially spherical or spheroidal particles of satisfactory rigidity.

After the aging treatment, the spheres may be washed in any suitable manner. A particularly satisfactory method is to wash the spheres by percolation, either with upward or downward flow of water, and preferably with water containing a small amount of ammonium hydroxide and/or ammonium nitrate. Preferably, treated water substantially free from impurities, is utilized in the washing steps of the process in order that undesirable impurities are not introduced into the catalyst from this source. After washing, the spheres may be dried at a temperature of from about 200° to about 600° F. for 2 to 24 hours or more, or dried at this temperature and then calcined at a temperature of from about 800° to about 1400° F. for 2 to 12 hours or more, and then composited with the platinum. It is preferred that the spheres be dried slowly and also that the drying be effected in a humid atmosphere because this has been found to result in less breakage of the spheres. In another embodiment of the invention the spheres may be treated with the halogen and/or platinum prior to the drying or drying and calcining operations, and the final catalyst composite then may be subjected to further drying and calcining as desired.

In another embodiment of the invention and particularly when preparing high density spheres, the spheres may be given a quick wash, dried at a temperature of from about 200° to about 300° F. in a high humidity atmosphere, calcined at a temperature of from about 800° to about 1400° F. and further washed, preferably with water containing ammonium hydroxide and/or ammonium nitrate. Care must be exercised in preventing the spheres from absorbing moisture from the air which will occur before the spheres are subjected to high temperature drying, and this is particularly applicable to the high density spheres. Therefore, it is preferred to calcine the high density spheres immediately after drying without permitting the spheres to cool.

The alumina spheres as prepared in the above manner are readily washed to remove volatile impurities and are of particular advantage for use in the preparation of low platinum containing catalysts, apparently due to some peculiar association of the alumina with the platinum, either as a chemical combination or as a physical association. Similarly, it has been found that, when employed, the halogen enters into an association with the alumina and/or platinum, either as a chemical combination or physical association, and, thereby serves to further improve the final catalyst. The specific combination of alumina and low platinum concentrations, particularly with the halogen, produces a very active catalyst and one that has a long catalyst life; that is, the catalyst retains its high activity for long periods of service.

For the purposes of the present specification and claims, the use of the term "platinum" is intended to include both the combined platinum and the free platinum. As hereinbefore set forth, it is believed that the platinum is present in a combined state. However, in some state during preparation or use of the catalyst, the platinum may be present as free platinum. The use of the term "halogen," "fluorine" or "chlorine" is intended to mean the combined halogen as it is believed that the halogen is combined with the alumina and/or platinum. It is not believed that any free halogen as such is present in the catalyst because the free halogen would be liberated during the heating steps in the manufacture of the catalyst.

As hereinbefore set forth, the catalyst contains from about 0.01% to about 1% by weight of platinum and the preferred catalyst also contains from about 0.1% to about 8% by weight of a halogen. When the halogen comprises fluorine, it is present in an amount of from about 0.1% to about 3% by weight and when the halogen comprises chlorine it is present in an amount of from about 0.1% to about 8% by weight. In another preferred embodiment, the halogen will comprise a mixture of combined chlorine and combined fluorine, the total thereof being within the range of from about 0.1% to about 8% by weight.

The alumina spheres, prepared in the above manner, may be composited with the platinum and, when utilized, halogen in any suitable manner. The halogen should be added in a form which will readily react with the alumina in order to obtain the desired results and also must not leave undesired deposits in the catalyst. A preferred method of adding the halogen is in the form of an acid, such as hydrogen fluoride, hydrogen chloride, hydrogen bromide and/or hydrogen iodide. Hydrogen fluoride is preferably added as an aqueous solution for each in handling and for control of the specific amount to be used. Another satisfactory source to be used for adding the halogen is the volatile salts, such as ammonium fluoride, ammonium chloride, etc. The ammonium ions will be removed during the subsequent heating of the catalyst and, therefore, will not leave undesirable deposits in the catalyst. In still another method, the halogen may be added as fluorine, chlorine, bromine or iodine but, in view of the fact that fluorine and chlorine normally exist as a gas, it is generally preferable to utilize them in the form of a solution for ease in handling. As hereinbefore set forth, the concentration of halogen will be within the range of from about 0.1% to about 8% by weight of the alumina on a dry basis.

As herein before set forth, in a preferred method the fluorine is added as an aqueous solution of hydrogen fluoride to the alumina sol before it is commingled with the hexamethylene tetramine solution. It is understood, however, that the halogen may be added to the alumina spheres after they have been dried and calcined and either before, after or at the same time that the platinum is composited therewith. As hereinbefore set forth, the halogen preferably comprises fluorine and in another preferred embodiment of the invention the halogen comprises a mixture of combined chlorine and combined fluorine. The chlorine may come from that present in the source of alumina and/or platinum, more specifically, from the aluminum chloride and/or chloroplatinic acid used in preparing the catalyst. However, the alumina must be washed thoroughly to remove volatile impurities and, therefore, preferably a substantial portion of the chlorine remaining from the aluminum chloride is removed. This method of treatment is preferred because it not only removes other undesirable impurities but also permits more effective control of the amount of chlorine by adding the chlorine in a subsequent step of the process. In still another embodiment, chlorine may comprise the sole halogen in the catalyst and, here again, it is preferred that the desired amount of chlorine be added in a separate step of the process.

The platinum may be added to the alumina spheres before they are dried and calcined but preferably is added to the alumina spheres after drying and calcining and after the halogen has been composited therewith. Preferably, the platinum is added in the form of a solution, and chloroplatinic acid solution is generally preferred because of its ready availability. Solutions of other platinum-containing compounds may be employed including those of ammonium-platinumchloride, trimethylbenzyl ammonium platinum chloride, tetramino platino chloride, ammonium platino nitrate, dinitro diamino platinum, etc. When the platinum is to be added to the alumina in the wet condition, that is before drying and calcining, the platinum is preferably added in the form of a colloidal suspension of a platinum sulfide in water as this method results in uniform distribution of the platinum throughout the alumina. In this method, hydrogen sulfide is added to an aqueous solution of chloroplatinic acid and the addition of hydrogen sulfide is continued until the solution reaches a constant coloration; that is, will not change color upon the addition of more hydrogen sulfide. The chloroplatinic acid solution is normally light yellow and, upon addition of hydrogen sulfide gas, turns to a dark brown color. Apparently the chloroplatinic acid and hydrogen sulfide react to form one or more complex chemical compounds. The brown solution of chloroplatinic acid and hydrogen sulfide may then be commingled with the slurry of wet alumina spheres in any suitable manner.

As hereinbefore set forth, a preferred method is to add the platinum to the alumina spheres after the latter have been dried and calcined. In this method of compositing the platinum, an aqueous solution of chloroplatinic acid or other suitable platinum-containing compound is commingled with the alumina spheres in the presence of ammonium hydroxide. A particularly preferred method is to commingle chloroplatinic acid with ammonium hydroxide to form a mixture having a pH within the range of from about 5 to about 10, preferably within the range of from about 8 to about 10, and then commingle this mixture with the alumina or alumina-halogen spheres. It is understood that the ammonium hydroxide or platinum compound may be added first to the alumina spheres and then the other compounds are added and that these compounds may be composited either as cold or hot solutions.

After the platinum has been composited in the catalyst, the catalyst should not be calcined at a temperature above about 1000° F. and preferably is calcined at a temperature of from about 600° to about 1000° F. for a period of from about 2 to 12 hours or more. Therefore, in a preferred embodiment the alumina-halogen spheres are calcined at a temperature of from about 800° to about 1400° F. and, after the platinum is composited therewith, are further calcined at a temperature of from about 600° to about 1000° F. Preferably, the calcination is effected in the presence of air, although, in one embodiment of the invention, the catalyst may be calcined in the presence of hydrogen and, in still another embodiment of the invention, may be calcined first in the presence of hydrogen and then in the presence of air, or the reverse procedure may be utilized.

Although the catalyst of the present invention will have a long life, it may be necessary to regenerate the catalyst after long periods of service. The regeneration may be effected by treatment with air or oxygen-containing gas to burn the carbonaceous deposits therefrom. In general it is preferred to control the regeneration temperature not to exceed about 1000° F., and preferably the regeneration is effected at a temperature within the range of from about 600° to about 800° F.

The improved catalyst of the present invention may be employed in any process for which platinum is a catalyst. The improved catalyst is particularly satisfactory for reforming operations in which is saturated gasoline, such as straight run gasoline, natural gasoline, etc. is subjected to conversion to produce a reformed gasoline of improved anti-knock properties. The saturated gasoline generally comprises a mixture of naphthenic and paraffinic hydrocarbons, and the reforming operation effects dehydrogenation of the naphthenic hydrocarbons to aromatics, cyclization of the paraffinic hydrocarbons to aromatics, as well as to effect a controlled type of cracking which is selective both in quality and in quantity. In addition, other reactions may occur such as isomerization, hydrogen transfer, etc. The controlled or selective cracking is desirable because it further increases the octane number of the reformed gasoline, produces a gasoline of higher volatility and also converts the higher boiling fractions to lower boiling fractions within the range of gasoline. However, this cracking must be controlled because excessive cracking produces excessive normally gaseous products and also excessive carbonaceous deposits on and deactivation of the catalyst. The improved catalyst of the present invention is particularly desirable for reforming operations because the catalyst effects the desired aromatization and controlled cracking under the selected conditions of operation.

The catalyst of the present invention may also find utility in the treatment of higher boiling saturated fractions such as kerosene, gas oil, etc. In many cases it is desirable to produce from kerosene a highly aromatic product useful as a solvent, and the present invention is readily applicable for this purpose. The gasoline, kerosene, etc. fractions comprise a mixture of different hydrocarbons and, in accordance with the invention, the full boiling range fraction or any selected fraction thereof may be subjected to the desired conversion. When a selected fraction is so treated, it may be blended, all or in part, with the other fraction.

The catalyst of the present invention may prove particularly useful for destructive hydrogenation or hydrocracking reactions in which hydrocarbons and particularly oil heavier than gasoline is subjected to conversion to produce lower boiling products and particularly gasoline. For cracking reactions, it is preferred that the halogen content of the catalyst be within the upper limits of the ranges hereinbefore set forth because these higher halogen catalysts are more active for effecting decomposition reactions.

The catalyst of the present invention may also be useful for effecting non-destructive hydrogenation reactions including the hydrogenation of unsaturated aliphatic hydrocarbons, such as mono-olefins, di-olefins, etc., to form the corresponding saturated hydrocarbons, hydrogenation of unsaturated cyclic hydrocarbons, hydrogenation of unsaturated alcohols, ketones, acids, etc. Other reactions in which these catalysts may find utility include oxidation as, for example, oxidation of olefins to form the corresponding oxide, such as the oxidation of ethylene to ethylene oxide, propylene to propylene oxide, etc., oxidation of alcohols, ketones, etc. These and other oxidation reactions are well known in the art, and it is within the scope of the present invention to effect these reactions in the presence of the novel catalysts disclosed herein. In reactions involving hydrogenation, oxidation or condensation, it is preferred that the halogen content of the catalyst be within the lower limits of the ranges hereinbefore specified in order to minimize side reactions.

As hereinbefore set forth, selected, processing conditions are required depending upon the particular reaction desired. For reforming of straight run gasoline the temperature employed should be within the range of from about 600° to about 1000° F., the pressure within the range of from about 50 to about 1000 pounds per square inch, and the weight hourly space velocity within the range of from about 0.5 to about 10. For dehydrogenation of normal butane the temperature should be within the range of from about 800° to about 1100° F., the pressure from about atmospheric to about 50 pounds per square inch, and the gaseous hourly space velocity from about 200 to about 5000. For hydrogenation reactions the temperature may range from atmospheric to about 600° F., the pressure from about 100 to about 3000 pounds or more, and the weight hourly space velocity from about 0.5 to 5. The weight hourly space velocity is defined as the weight of oil per hour per weight of catalyst in the reaction zone.

In one embodiment of the process, sufficient hydrogen will be produced in the reforming reaction to furnish the hydrogen required in the process and, therefore, it may be unnecessary to either introduce hydrogen from an extraneous source or to recycle hydrogen within the process. However, it usually will be preferred to introduce hydrogen from an extraneous source, generally at the beginning of the operation, and to recycle hydrogen within the process in order to be assured of a sufficient hydrogen atmosphere in the reaction zone, which is within the range of from about 0.5 to about 10 mols of hydrogen per mol of hydrocarbon. In some cases the gas to be recycled will contain hydrogen sulfide, introduced with the charge or liberated from the catalyst, and it is within the scope of the present invention to treat the hydrogen-containing gas to remove hydrogen sulfide or other impurities before recycling the hydrogen within the process.

The process of the present invention may be effected in any suitable equipment. A particularly suitable process comprises the well known fixed bed system in which the catalyst is disposed in a reaction zone and the hydrocarbons to be treated are passed therethrough in either upward or downward flow. The products are fractionated to separate hydrogen and to recover the desired products. As hereinbefore set forth, the hydrogen may be recycled for further use in the process. Other suitable units in which the process may be effected include the fluidized type process in which the hydrocarbons and catalysts are maintained in a state of turbulence under hindered settling conditions in a reaction zone, the compact moving bed type in which the catalyst and hydrocarbons are passed either concurrently or countercurrently to each other, and the suspensoid type of operation in which the catalyst is carried into a reaction zone as a slurry in the hydrocarbon oil.

The following examples are introduced to further illustrate the novelty and utility of the present invention but not with the intention of unduly limiting the same.

EXAMPLE I

A catalyst containing 0.3% platinum, 0.33% combined fluorine and 0.41% combined chlorine was prepared as follows.

The alumina sol was prepared as follows: 482 gms. of aluminum chloride hexahydrate were dissolved in water to make 1500 ml. of solution. 240 gms. of aluminum turnings (99.9% pure) were added to this solution. The mixture was heated and digested for 192 hours, after which the mixture was filtered and the filtered sol was diluted with water to 1500 ml. The sol had a density of 1.397 and a pH of 3.11. 400 ml. of the alumina sol was mixed with 11.07 gms. of a dilute hydrogen fluoride solution (5.4 gms. of 48% HF diluted with water to 54 gms.) to form solution A. 296 gms. per liter of a hexamethylene tetramine solution was prepared as solution B.

10 ml. of solution A and 10 ml. of solution B were mixed and the resulting mixture was allowed to fall dropwise into an oil bath containing a 1½:2 mixture of o-dichlorobenzene and Nujol which was maintained at a temperature of 230° F. 40 batches of spheres were made in this manner and were allowed to accumulate in the oil bath. The spheres were separated from the oil and immediately thereafter were placed in hot hexamethylene tetramine solution (296 gms. per liter) in which the spheres were aged at 200–210° F. for 21 hours. The aging solution was decanted from the spheres and the spheres were washed five times with 1500 ml. portions of water and then with 1500 ml. of a 10% ammonium nitrate aqueous solution (adjusted to a pH of about 8 with ammonium hydroxide), after which the spheres were washed three times with 1500 ml. portions of water. The spheres were then further washed a number of times with 1500 ml. of water containing ammonium hydroxide (4 ml. NH$_4$OH to 1500 ml. H$_2$O). The effluent of the final wash was analyzed and showed a negative test for chlorine. The spheres were then dried in a humid atmosphere in a forced draft oven at 250–260° F. for 3½ hours, after which they were calcined at 1200° F. for 3 hours.

The calcined spheres were soaked in an aqueous solution of chloroplatinic acid in an amount to form a final catalyst containing 0.3% by weight of platinum. The solution was evaporated to dryness and the spheres were then dried at a temperature of 210° F. for 1 hour and finally calcined at a temperature gradually increasing to 932° F. for a period of 3 hours and then held at this temperature for 3 hours.

The catalyst as prepared in the above manner had a density of 0.73 (gms. per cc.), a surface area of 175 square meters per gram, and a pore diameter of 108 Angstrom units. This catalyst was used for the reforming of a Mid-Continent naphtha having a boiling range of 220–390° F. and the octane properties as set forth in Table 1. The reforming operation was effected at a temperature of 850° F., a pressure of 500 pounds per square inch and a hydrogen:hydrocarbon ratio of 3.29:1. The run was continued for 22 hours, and the results are shown in the following table:

Table 1

| | Charge | Reformed Gasoline |
|---|---|---|
| Yield, wt. percent of debutanized reformed gasoline | | 92.7 |
| Octane Numbers: | | |
| ASTM Motor Method, Clear | 33.5 | 72.2 |
| ASTM Motor Method + 3 cc. of tetraethyl lead | 58.3 | 83.6 |
| ASTM Research Method, Clear | 30.0 | 80.2 |
| ASTM Research Method with 3 cc. of tetraethyl lead | 58.9 | 91.2 |
| Aromatics, wt. percent of charge | | 47.8 |
| Percent over at 212° F | 0 | 8.5 |
| Carbon | | 0.3 |

It will be noted from the above table that the catalyst of the present invention produced a high yield of a high octane number reformed gasoline.

EXAMPLE II

A catalyst similar to that prepared in Example I but having a low density (0.45) was prepared in substantially the same manner as described in Example I except as regards the aging of the alumina-halogen spheres. The spheres in this example were aged in 1 liter of hot Nujol at a temperature of 200–210° F. for about 21 hours, the Nujol was decanted from the spheres, and the spheres were then aged in 1 liter of hot ammonium hydroxide solution (5 parts water and 1 part concentrated ammonium hydroxide) at 200–210° F. for about 24 hours. The spheres were then washed, dried, calcined and composited with platinum in substantially the same manner as described in Example I. The catalyst as prepared in this manner had a density of 0.45 (gms. per cc.) and contained 0.3% platinum, 0.33% combined fluorine and 0.36% chlorine by weight. This catalyst was used for the reforming of another portion of the Mid-Continent naphtha used in Example I at substantially the same operating conditions and produced the following results.

*Table 2*

|  | Reformed gasoline |
|---|---|
| Yield, weight percent of the debutanized reformed gasoline | 92.9 |
| Octane numbers: |  |
| ASTM Motor Method, clear | 72.6 |
| ASTM Motor Method with 3 cc. of tetraethyl lead | 82.8 |
| ASTM Research Method, clear | 79.0 |
| ASTM Research Method with 3 cc. of tetraethyl lead | 91.5 |
| Aromatics, weight percent of charge | 46.3 |
| Percent over at 212° F | 6.0 |
| Carbon | 0.37 |

It will be noted from the data in the above table that the low density catalyst also produced high yields of high octane number reformed gasoline.

The low density spheres offer a particular advantage for the platforming catalyst because an equal volume of catalyst requires a lower weight of the low density spheres. This, therefore, means that a lower weight of platinum is utilized and, because of the high cost of the platinum, results in a considerably lower cost of the catalyst. This is particularly true as demonstrated by the two previous examples in which substantially equal results were obtained with the low density catalyst as compared to the high density catalyst.

I claim as my invention:

1. A method of manufacturing a spheroidal shaped catalyst which comprises forming an alumina sol, commingling said sol with water and hydrogen fluoride to form a mixture containing from about 15% to about 35% by weight of alumina, and from about 0.1% to about 3% by weight of fluorine in the final catalyst, separately commingling water with hexamethylene tetramine to form a solution containing from about 15% to about 40% by weight of hexamethylene tetramine, commingling said mixture and said hexamethylene tetramine solution at below gelation temperature and in a volume ratio of hexamethylene tetramine solution to said mixture of from about 3:1 to about 1:1.5, passing droplets of the resultant mixture into an oil bath maintained at a temperature of from about 120° to about 220° F., retaining the droplets in said oil bath until the droplets set to hydrogel spheres, immediately thereafter aging said spheres in a basic medium, washing and drying said spheres, thereafter combining platinum therewith in an amount of from about 0.01% to about 1% by weight of said alumina on a dry basis, and subsequently calcining the composite.

2. The method of claim 1 further characterized in that said aging is effected in the presence of hexamethylene tetramine solution.

3. The process of claim 1 further characterized in that said aging is effected first in oil at a temperature of from about 120° to about 220° F. for at least 10 hours and then in ammonium hydroxide solution for at least 10 hours.

4. A method of manufacturing a spheroidal shaped catalyst which comprises digesting aluminum metal in an aqueous aluminum chloride solution to form an alumina sol, commingling said sol with water and hydrogen fluoride to form a mixture containing from about 15% to about 35% by weight of alumina, and from about 0.1% to about 3% by weight of fluorine in the final catalyst, separately commingling water with hexamethylene tetramine to form a solution containing from about 15% to about 40% by weight of hexamethylene tetramine, commingling said mixture and said hexamethylene tetramine solution at below gelation temperature and in a volume ratio of hexamethylene tetramine solution to said mixture of from about 3:1 to about 1:1.5, passing droplets of the resultant mixture into an oil bath maintained at a temperature of from about 120° to about 220° F., retaining the droplets in said oil bath until the droplets set to hydrogel spheres, withdrawing said spheres from said oil bath and immediately thereafter aging the spheres in a basic medium, washing said spheres, drying the same at a temperature of from about 200° to about 600° F. and calcining the same at a temperature of from about 800° to about 1400° F., thereafter commingling said spheres with a chloroplatinic acid solution to combine platinum therewith in an amount of from about 0.01% to about 1% by weight of said alumina on a dry basis, evaporating the mixture to dryness and subsequently calcining the same at a temperature of from about 600° to about 1000° F.

5. A method of manufacturing a spheroidal shaped catalyst which comprises digesting aluminum metal in an aqueous aluminum chloride solution to form an alumina sol, commingling said sol with water and hydrogen fluoride to form a mixture containing from about 5 to about 15% by weight of alumina, and from about 0.1 to about 3% by weight of fluorine in the final catalyst, separately commingling water with hexamethylene tetramine to form a solution containing from about 15% to about 40% by weight of hexamethylene tetramine, commingling said mixture and said hexamethylene tetramine solution at below gelation temperature and in a volume ratio of hexamethylene tetramine solution to said mixture of from about 1:2 to about 1:20, passing droplets of the resultant mixture into an oil bath maintained at a temperature of from about 120° to about 220° F., retaining the droplets in said oil bath until the droplets set to hydrogel spheres, withdrawing said spheres from said oil bath and immediately thereafter aging the spheres in a basic medium, washing said spheres, drying the same at a temperature of from about 200° to about 600° F. and calcining the same at a temperature of from about 800° to about 1400° F., thereafter commingling said spheres with a chloroplatinic acid solution to combined platinum therewith in an amount of from about 0.01% to about 1% by weight of said alumina on a dry basis, evaporating the mixture to dryness and subsequently calcining the same at a temperature of from about 600° to about 1000° F.

6. The method of claim 5 further characterized in that the mol ratio of aluminum chloride to aluminum metal in said digesting is within the range of from about 1:5 to about 1:7.

7. A method for the production of platinum-alumina-halogen catalyst, which comprises adding an aqueous solution of a hydrogen halide to an alumina sol in an amount to form a final catalyst containing from about 0.1% to about 8% by weight of halogen, commingling with the resultant mixture, at below gelation temperature, the reaction product of ammonia with an aliphatic aldehyde, said reaction product being a weak base which is hydrolyzable at a temperature between about 120° F. and about 220° F., introducing the resultant ungelled mixture of hydrogen halide solution, alumina sol and said reaction product in the form of droplets into a water-immiscible suspending medium and maintaining the latter at a gelation temperature of from about 120° F. to about 220° F., retaining the droplets in the suspending medium until gelation occurs, removing the resultant gelled particles from said medium and combining platinum therewith.

8. A method for the production of platinum-alumina-halogen catalyst, which comprises adding an aqueous solution of a hydrogen halide to an alumina sol in an amount to form a final catalyst containing from about 0.1% to about 8% by weight of halogen, commingling hexamethylene tetramine with the resultant mixture at below gelation temperature, introducing the ungelled mixture of hydrogen halide solution, alumina sol and hexamethylene tetramine in the form of droplets into a water-immiscible suspending medium and maintaining the latter at a gelation temperature of from about 120° F. to about 220° F., retaining the droplets in the suspending medium until gelation occurs, removing the resultant gelled particles from said medium and combining platinum therewith.

9. A method for the production of platinum-alumina-fluorine catalyst, which comprises adding an aqueous solution of hydrogen fluoride to an alumina sol in an amount to form a final catalyst containing from about 0.1% to about 3% by weight of fluorine, commingling hexamethylene tetramine with the resultant mixture at a temperature below about 110° F., introducing the ungelled mixture of hydrogen fluoride solution, alumina sol and hexamethylene tetramine in the form of droplets into a water-immiscible suspending medium and maintaining the latter at a gelation temperature of from about 120° F. to about 220° F., retaining the droplets in the suspending medium until gelation occurs, removing the resultant fluorine-containing alumina gel particles from said medium and combining platinum therewith in amount of from about 0.01% to about 1% by weight of the alumina on a dry basis.

References Cited in the file of this patent

UNITED STATES PATENTS

| Number | Name | Date |
|---|---|---|
| 2,328,846 | Pitzer | Sept. 7, 1943 |
| 2,400,709 | Patrick | May 21, 1946 |
| 2,404,024 | Bailie et al. | July 16, 1946 |
| 2,406,420 | Weiser | Aug. 27, 1946 |
| 2,423,686 | Cummins | July 8, 1947 |
| 2,450,394 | Brown et al. | Sept. 28, 1948 |
| 2,471,000 | Messenger | May 24, 1949 |
| 2,479,109 | Haensel | Aug. 16, 1949 |
| 2,492,808 | Marisic et al. | Dec. 27, 1949 |
| 2,524,810 | Kimberlin | Oct. 10, 1950 |
| 2,543,132 | Shobaker | Jan. 27, 1951 |
| 2,560,329 | Brandon | July 10, 1951 |
| 2,620,314 | Hoekstra | Dec. 2, 1952 |